Dec. 9, 1930.  C. J. O'NEIL  1,784,495
METHOD OF ORNAMENTING SURFACES
Filed Dec. 24, 1927

INVENTOR:
Cornelius J. O'Neil
By Chindahl, Parker & Carlson
Attys.

Patented Dec. 9, 1930

1,784,495

UNITED STATES PATENT OFFICE

CORNELIUS J. O'NEIL, OF OAK PARK, ILLINOIS

METHOD OF ORNAMENTING SURFACES

Application filed December 24, 1927. Serial No. 242,404.

The invention relates generally to a method of ornamenting a surface and more particularly to a method of carving by sandblast in which certain portions of the surface of an article are removed or cut away to form a figure, letter, design or the like either cut in the surface or in relief thereon.

It has generally been customary in the preparation of an article which is to be carved, to cover or coat the surface of the article with a gelatinous coating of an adhesive character, adapted, when it has been permitted to set, to present a compressible or yielding which is substantially immune to the action of a sand-blast. After the gelatinous coating has formed, the coating or mask is cut according to any preconceived pattern, which cut portions are then removed to expose the surface of the article which is to be removed. The sand-blast is then applied to the entire surface but attacks only the portions not covered and protected by the gelatinous coating. In this method great skill and care are necessary in performing the step of cutting the pattern in the coating and in removing the cut portions since a mistake or error once made cannot be suitably rectified, and in consequence the method is slow and relatively costly.

An object of the invention is to provide a new and improved method for ornamenting an article which is economical and inexpensive and which may be easily and speedily performed by a relatively unskilled workman.

Another object of the invention is to provide a novel method which comprises delineating the desired design upon a surface in the application thereto of a layer of material substantially impervious to a cutting substance and then cutting away the portions of the surface unprotected by the impervious material.

Another object is to provide a novel method of this character involving the application of an ornamentation to a surface through a design matrix either the ornamental area or the surrounding area being covered with a material substantially impervious to the action of a sand-blast and then subjecting the surface to a sand-blast.

Another object of the invention is to provide a method of carving in which the surface has provided thereon by molding directly thereto, over the portions to be attacked by the action of the sand-blast, a substantially hard brittle substance susceptible to the action of the sand-blast, after which the remaining portions of the surface are covered with a protective coating.

Other objects and advantages will become apparent from the following description and in the accompanying drawings in which Figure 1 is a fragmentary perspective view of an article after the initial step in the method has been performed.

While I will describe the method as being applied to the carving of a stone surface as, for example, a granite monument, it will be understood that the method is also susceptible of use in other processes, such as sand-blasting glass surfaces or in the various etching processes.

The formation of an ornamental configuration, which, it is contemplated, may embrace letters, figures, designs of various kind and the like, on the surface of a monument is generally of one of two types, that is, the configuration may itself be cut or recessed in the material or the material may be cut away or removed about the configuration, leaving it in relief.

Describing first the method by which the recessed configuration is provided, I employ a moulded or built up pattern of material upon the surface to be carved, which pattern preferably is adapted to adhere naturally to the surface but may be attached thereto, in case a non-adhesive substance is used, by a suitable glue or the like.

In this embodiment, two separate and physically different substances are used in forming the superimposed pattern, one of which is the commercially well known gelatinous substance or gum, previously mentioned. The other substance preferably is one which will adhere readily to the stone surface, will form a sharp margin when moulded and is either of rapidly setting plastic composition or is substantially hard and solid at normal room temperature and is capable of being easily melted and poured. Moreover, it is desirable that this substance be one that does not adhere to or unite with the gelatinous gum.

It has been found that certain waxy substances, such as a relatively high grade of beeswax, possess all of these properties and may be used in conjunction with the gelatinous coating in forming the pattern. If desired, a filler of some inert material such as chalk dust, plaster of Paris or the like may be added to the wax to absorb any excessive oil contained therein and to provide additional body and hardness thereto.

Figure 4:
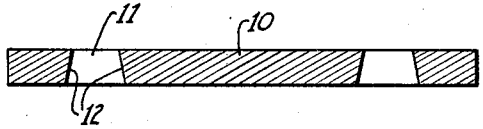
Fig. 4 is a transverse section taken in the line 4—4 of Fig. 3.
Figure 5:
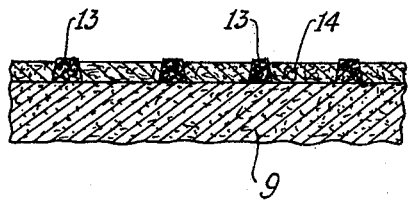
Fig. 5 is a section taken on the line 5—5 of Fig. 2.

With reference to the drawings, the pattern is built upon the cleaned surface of the monument in steps, the first being to form the desired configuration thereon in the waxy substance. In order to do this speedily, uniformly and accurately, the figure is preferably formed directly on the surface by means of a matrix or mould (Fig. 4). The matrix in this instance comprises a suitable plate 10, the thickness of which is governed generally by the depth of the pattern which is to be formed. The configuration which is herein shown and will be subsequently referred to as a letter, is cut through the surface of the plate and as shown in Fig. 4 the margins 12 of the aperture 11 thus formed are preferably on an incline or bevel to the surface 10 thereof to facilitate the removal of the matrix from the moulded substance. Preferably the matrix is of a resilient material which permits it to be pressed firmly against the somewhat uneven surface of the monument to insure that the margins of the moulded letter will be sharply defined. In practice the more frequently used characters are provided in complete sets of separate matrices which may be used repeatedly as required.

Figure 1:
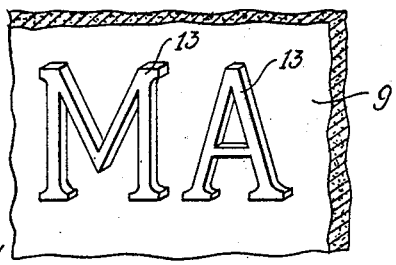
Figure 2:
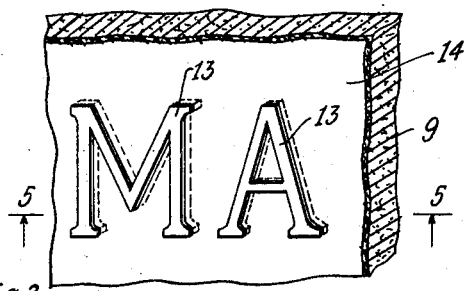
Fig. 2 is the same view after the protective coating has been applied.
Figure 3:
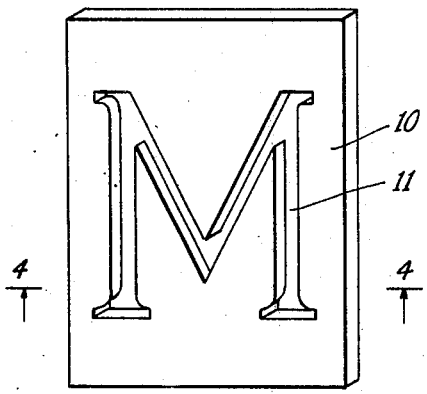
Fig. 3 is an enlarged perspective view of the preferred means by which the first step shown in Fig. 1 is accomplished.

In performing the steps of the method the matrix is first applied to the cleaned surface of the stone 9 with the aperture therein directly overlying the portion of the surface to be carved. The liquid waxy substance is then poured over the matrix completely filling the aperture after which it is allowed to set or harden. The excess wax on the outer surface of the matrix may then be cut away and the matrix removed leaving the letter 13 adhering to the surface of the monument as shown in Fig. 1. Thus the sharp margins of the moulded letter delineate the edges of the portion of the stone which is to be blasted out.

The gelatinous protecting gum 14 is next applied in the usual manner by pouring or brushing, over the surface of the monument about the wax letter 13, care being taken that none of the gelatinous substance covers or remains on any part of the wax.

After a sufficient length of time has elapsed to permit the gelatinous substance to attain the required consistency and compressibility, the sand-blast may be turned on the surface of the pattern. Since the waxy matter 13 is substantially hard and brittle the sand-blast will attack and remove it readily, after which the surface of the monument which was covered thereby will be attacked and carved to the proper depth. Finally, the gelatinous gum 14 is removed or peeled from the stone surface to complete the operation.

Figure 6:
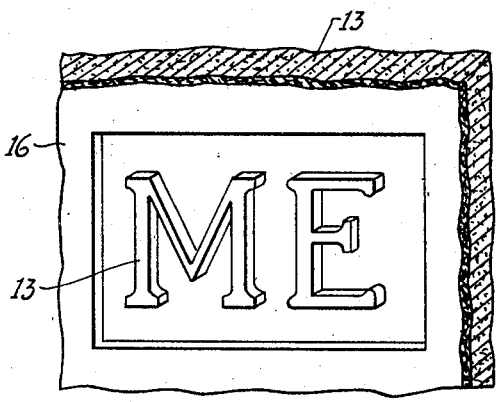
Fig. 6 is a view similar to Fig. 1 showing a modified step employed in the production of an ornamented figure in relief.

The carving of the monument to form configurations thereon in relief is attained in substantially the same manner by the use of the matrix. In this method, however, the use of the waxy substance may be omitted and the protecting gelatinous gum poured over the matrix to fill the apertures therein, which after the excess material on the surface of the matrix and the matrix has been removed leaves the desired configuration 15 (Fig. 6) formed of protecting material on the monument. It will be seen that when the matrix has been removed the surface to be attacked and carved out is already exposed and it only remains to shape the excess of the gelatinous material, designated as 16, which adhered to the stone beyond the edges of the matrix to form the margins of an enclosing panel or the like and then to subject the surface to the action of the sand-blast. After the carving is completed the gelatinous substance forming the configurations and protecting the surface beyond the panel may be peeled from the stone as before.

Since it is necessary to allow the gelatinous substance to set for a considerable period of time before the matrix may be safely removed, the matrix may be formed of the waxy substance used in the recess cutting. Where this method is followed, it is not necessary to remove the matrix after moulding the configuration in the gelatinous substance as the sand-blast will do so.

It will be apparent that I have provided a method for ornamenting an object, which may be rapidly and easily followed by a relatively unskilled workman, whereby the cost of production of the finished article is materially reduced. Moreover, since each character is formed separately without necessitating the coating of the entire surface with the protecting coating any mistakes or errors may be easily corrected without damage or delay.

Although the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claim.

I claim as my invention:

A method of ornamenting a surface which comprises defining the characteristic to be formed by moulding directly onto the surface through the interstices of a matrix a plastic material which sharply conforms to the margins of the interstices and fills the inequalities of the surface, allowing the material to become substantially brittle, coating said surface around the moulded characteristic with a sand-blast-resistant material, and subjecting the surface to a sandblast.

In testimony whereof, I have hereunto affixed my signature.

CORNELIUS J. O'NEIL.